United States Patent [19]
Ruckstuhl

[11] Patent Number: 6,035,762
[45] Date of Patent: Mar. 14, 2000

[54] ESPRESSO MACHINE

[75] Inventor: Stephan Ruckstuhl, Neuendorf, Switzerland

[73] Assignee: Eldom Rothrist AG, Rothrist, Switzerland

[21] Appl. No.: 09/105,090

[22] Filed: Jun. 26, 1998

[30] Foreign Application Priority Data

Jun. 27, 1997 [CH] Switzerland ............................. 1555/97

[51] Int. Cl.[7] ................................................... A47J 31/40
[52] U.S. Cl. .......................... 99/295; 99/289 R; 99/302 R
[58] Field of Search ................................. 99/295, 302 R, 99/302 P, 289 R

[56] References Cited

U.S. PATENT DOCUMENTS

| | | | |
|---|---|---|---|
| 4,852,472 | 8/1989 | In-Albon et al. | 99/289 R |
| 5,275,089 | 1/1994 | Armellin | 99/289 R |
| 5,520,093 | 5/1996 | Ackermann | 99/289 T |
| 5,755,149 | 5/1998 | Blanc et al. | 99/289 T |
| 5,776,527 | 7/1998 | Blanc | 99/295 |

FOREIGN PATENT DOCUMENTS

| | | |
|---|---|---|
| 0 717 603 | 9/1995 | European Pat. Off. . |
| 0 885 582 A1 | 12/1998 | European Pat. Off. . |
| WO 95/07041 | 3/1995 | WIPO . |
| WO 95/17121 | 6/1995 | WIPO . |

*Primary Examiner*—Reginald L. Alexander
*Attorney, Agent, or Firm*—Finnegan, Henderson, Farabow, Garrett & Dunner, L.L.P.

[57] ABSTRACT

A coffee machine, which operates with filter capsules, having a brewing unit with two brewing-chamber parts which can be displaced relative to one another and, in a closed position, form a brewing chamber for the filter capsules, one of the two brewing-chamber parts being connected to a brewing-water heater and being provided with a multiple nozzle. By virtue of the fact that the multiple nozzle in the brewing-chamber part is arranged in a movable manner and that, at least while the coffee is being prepared, is forced in the direction of the other brewing-chamber part or of the filter capsule accommodated in the brewing chamber, the extraction values are improved, the use of filter capsules of different thicknesses is possible, and the situation where the filter capsules swell up and explode when subjected to the action of superheated steam is avoided.

12 Claims, 1 Drawing Sheet

ESPRESSO MACHINE

BACKGROUND OF THE INVENTION

1. Field of the Invention

The present invention generally relates to coffee machines. More particularly, the invention relates to espresso machines utilizing prepackaged, ready-to-use filters.

2. Description of the Related Art

Conventional coffee machines utilize filter capsules for use with a brewing unit. Typically, the brewing unit may have two brewing-chamber parts which can be displaced relative to one another and, in a closed position, form a brewing chamber for the filter capsules. Generally, one of the two brewing-chamber parts is connected to a brewing-water heater and is provided with a multiple nozzle.

The filters or filter capsules contain the coffee powder which is required for preparing one portion of coffee (e.g. a cup). Commonly, filter capsules for conventional coffee machines are prefabricated in a ready-to-use form and are packaged individually in a flavour-sealed wrapper.

In order to prepare coffee, a filter capsule, once removed from the wrapper, is introduced into the coffee machine from above, through a slot in the machine housing. The filter capsule is intercepted by suitable means between the two brewing-chamber parts, which are in their open position. The two brewing-chamber parts are then moved into their closed position, in which they enclose the filter capsule between them and seal said capsule with respect to external influences. In this position, a defined quantity of brewing water is forced through the brewing chamber and through the filter capsule contained therein. The resulting coffee is directed, via an outflow tube, into a cup which has been brought into position beforehand. Once the brewing operation has been completed, the brewing-chamber parts are moved apart from one another again, as a result of which the filter capsule drops further downwards into a collecting container provided there.

Conventional machines, as previously described, typically only function reliably with a specific type of filter capsule, i.e., a capsule which is designed for the machine and therefore has a defined size and thickness. However, at least certain variations in thickness would be desirable for the purpose of varying the quantity of coffee powder, and thus the desired strength of the coffee produced therewith.

Conventional coffee machines may also usually be used for preparing superheated steam, in which case the water heater is brought to a higher temperature than would be used for preparing coffee. However, in the known machines, problems arise upon changeover from steam preparation to coffee preparation. Specifically, if coffee is prepared immediately after the steam has been removed, i.e. if one does not wait until the reduced coffee temperature has been reached, the filter capsule is initially subjected to the action of steam which is still located in the flow heater and is very hot and under high pressure. This may result in the filter capsule swelling up and even actually exploding, which means that the entire brewing chamber is affected by soiling and has to be cleaned.

SUMMARY OF THE INVENTION

To overcome the disadvantages of the prior art, and in accordance with the purposes of the invention, as embodied and broadly described herein, there is provided a coffee machine comprising a brewing chamber and a multiple nozzle in the brewing-chamber part that is arranged in a movable manner. At least while the coffee is being prepared, the multiple nozzle is forced into the direction of the other brewing-chamber part or of the filter capsule contained in the brewing chamber. Because the multiple nozzle being pressed against it, the filter capsule is compressed, the speed at which the brewing water passes through it is reduced, and the extraction values are improved. In the flexible brewing chamber of the present invention, the quantity of coffee powder in the filter capsule can be varied, and it is readily possible for the thickness of the filter capsule to be varied by 2–3 mm in relation to the thickness which is conventional at present.

In accordance with the present invention, the multiple nozzle is pressurized, so that it is no longer possible for the filter capsule to swell up and explode if it is subjected to the action of superheated steam immediately after the latter has been prepared. Preferably, the force acting on the multiple nozzle can be exerted by a spring and/or hydraulically while the coffee is being prepared.

BRIEF DESCRIPTION OF THE DRAWING

The accompanying drawing, which is incorporated in and constitutes part of the specification, illustrates a presently preferred embodiment of the invention and, together with the general description given above and detailed description of the preferred embodiment given below, serve to explain the principles of the invention.

DESCRIPTION OF THE PREFERRED EMBODIMENT

Figure 1:
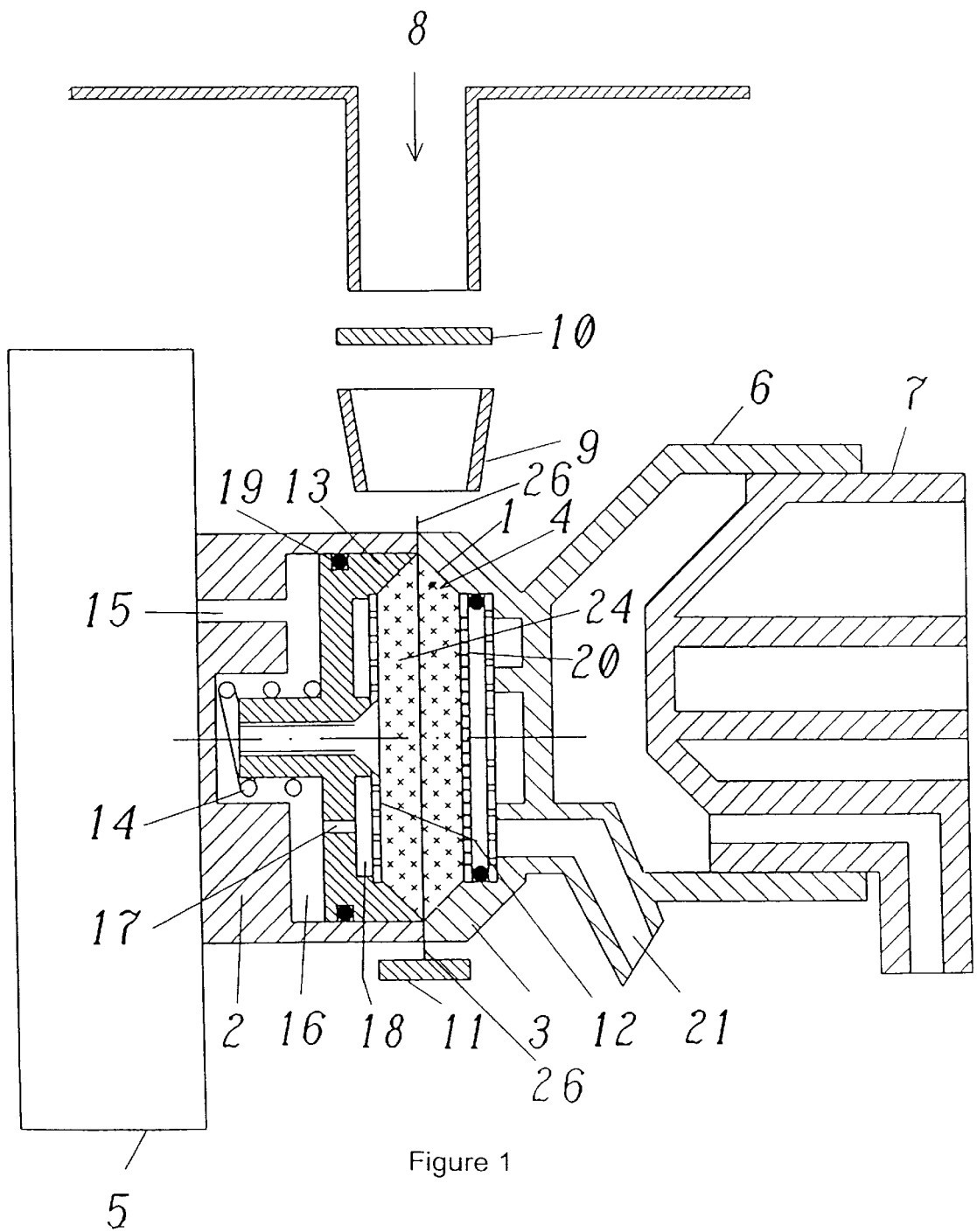
FIG. 1 is a schematic illustrating a side view of a brewing-chamber region of a coffee or espresso machine of the present invention.

Reference will now be made in detail to the present preferred embodiment of the invention as illustrated in the accompanying drawings.

A preferred embodiment of the coffee machine of the present invention is shown in FIG. 1. As embodied herein, the coffee machine is designed to accommodate a filter capsule 1 which is filled with coffee powder and is arranged in a brewing chamber 4 formed by a first brewing-chamber part 2 and a second brewing-chamber part 3. A peripheral border 26 of the filter capsule 1 is clamped between the end surfaces of the two brewing-chamber parts 2 and 3 and projects outwards a certain extent beyond the chamber parts.

Preferably, the first brewing-chamber part 2 is arranged in a stationary manner and is connected to a brewing-water heater 5, as shown in FIG. 1. The second brewing-chamber part 3 is adapted to be displaced hydraulically toward the first brewing-chamber part, i.e. counter to the action of the two springs (which cannot be seen in the drawing). To this end, the brewing-chamber part 3 is connected to a cylinder 6, in which a stationary piston 7 is arranged. The two brewing-chamber parts 2 and 3 are shown in FIG. 1 in a closed position, which is obtained when the space between the cylinder 6 and the piston 7 is subjected to the action of pressure. The pressure is produced by a pressure pump (not illustrated), which also serves as a brewingwater pump.

In accordance with the present invention, as embodied herein and shown in FIG. 1, the coffee machine includes a multiple-nozzle plate 12 in the first brewing-chamber part 2 to facilitate uniform distribution of the brewing water through the body of the filter 24. Preferably, the plate is positioned in a multiple-nozzle mount 13 which can be moved axially in the first brewing-chamber part 2. The multiple-nozzle mount 13 is subjected to the action of the pressure of a spring 14. The spring 14 forces the multiple-nozzle mount 13 in the direction of the second brewing-chamber part 3 and, when the brewing chamber 4 has been closed, forces the multiple-nozzle plate 12 against the filter capsule 1, as a result of which the latter is compressed.

In accordance with the present invention, the filter capsule 1 passes into the brewing chamber 4, when the brewing-chamber parts 2 and 3 are open, by being introduced from above through an introduction slot 8 and an introduction funnel 9. Preferably, the coffee machine includes screening means 10 for covering the introduction slot 8. The screening means 10 is briefly pivoted out of the region of the introduction slot 8 to pass the filter 1 through the slot 8. Level with the two brewing-chamber parts 2 and 3, the filter capsule is intercepted by a farther pivotable screening means 11.

In order to prepare the coffee, operation of the abovementioned pressure pump is actuated. The pump initially receives cold water from a water container (not illustrated) and pumps it into the space between the cylinder 6 and the piston 7. As a result, the second brewing-chamber part 3 is displaced towards the first brewing-chamber part. As soon as the brewing chamber 4 has been closed, actuation of a valve (not illustrated) causes the water to be fed out of the pressure pump into the brewing-water heater 5. From the latter, the water, now heated as brewing water, passes, via at least one first opening 15, into a variable interspace 16 upstream of the movable multiple-nozzle mount 13 in the first brewing-chamber part 2. By way of at least one second opening 17 in the movable multiple-nozzle mount 13, the water flows into a distributing space 18, which is mounted upstream of the multiple-nozzle plate 12, and from said distributing space, through the multiple-nozzle plate 12, into the brewing chamber 4.

In accordance with the present invention, a seal 19 prevents the brewing water from being able to flow past the movable multiple-nozzle mount 13 to the outside. In the brewing chamber 4, the brewing water passes through the filter capsule 1 with the coffee powder and then, in the form of coffee, leaves the brewing chamber 4 via a filter screen 20, which is positioned in the second brewing-chamber part 3. Finally, it flows, via a tubular outflow 21, into a cup (not illustrated) which has been brought into position beneath the outflow.

According to one preferred configuration, the flow cross-section for the brewing water in the at least one first opening 15 between the brewing-water heater 5 and the variable interspace 16 is selected to be greater than the flow cross-section in the at least one second opening 17 between the variable interspace 16 and the distributing space 18. As a result, a hydraulic pressure builds up in the variable interspace 16 while the coffee is being prepared, and this pressure assists the action of the spring 14. It would also be possible for the spring to be left out and for this dynamically building-up pressure alone to act on the multiple-nozzle structure.

Once the brewing operation has been completed, the pressure pump is switched off. As such, the pressure between the cylinder 6 and the piston 7 is decreased and the water, which is present there, is able to flow back into the water container. Under the action of the abovementioned springs (not illustrated), the second brewing-chamber part 3 moves away from the first brewing-chamber part 2, so that the brewing chamber 4 opened and the filter capsule 1 is released in the process. By virtue of the other screening means 11, having been pivoted away from beneath the brewing-chamber region beforehand, the used filter capsule 1 can automatically drop downwards, for example into a receiving container (not illustrated) provided there. This brings the coffee-preparing cycle to an end.

The coffee machine of the present invention, as embodied and broadly described herein, improves the quality of the coffee, enables the use of filter capsules of different thicknesses, and prevents filter capsules being destroyed when subjected to the action of superheated steam.

Additional advantages and modifications will readily occur to those skilled in the art. The invention in its broader aspects is, therefore, not limited to the specific details, representative apparatus and illustrative examples shown and described. Accordingly, departures may be made from such details without departing from the scope of the general inventive concept as defined by the appended claims and their equivalents.

What is claimed is:

1. An apparatus for using a coffee-filled filter capsule to produce a coffee beverage comprising:

a brewing unit having a pair of brewing chamber sections being movable relative to one another, between an open position for receiving the filter capsule and a closed position to form a brewing chamber for brewing the coffee; and at least one of the brewing chamber sections having a nozzle assembly in fluid communication with a water heater for admitting heated water into the brewing chamber, the nozzle assembly comprising a nozzle plate having at least one water nozzle wherein the nozzle plate compresses the filter when the brewing unit is in the closed position and heated water passes through at least one nozzle, also including a spring adjacent the nozzle assembly for acting with hydraulic pressure to urge the nozzle assembly toward the filter.

2. The apparatus as defined in claim 1, wherein the nozzle plate is in immediate contact with the filter capsule across the body of the filter capsule during the brewing process.

3. The apparatus according to claim 1, wherein the nozzle assembly includes a nozzle mount in which the nozzle plate is positioned; and wherein the nozzle mount includes a seal substantially surrounding the nozzle mount so that the heated water from the water heater is forced to pass through the nozzle plate prior to entering the brewing chamber.

4. An apparatus for using a coffee-filled filter to produce a coffee beverage comprising:

a brewing unit having a pair of brewing chamber sections being movable relative to one another, between an open position for receiving the filter capsule and a closed position to form a brewing chamber for brewing the coffee; and at least one of the brewing chamber sections having a nozzle assembly in fluid communication with a water heater for admitting heated water into the brewing chamber, the nozzle assembly comprising a nozzle plate having water nozzles, the nozzle assembly being movable in response to hydraulic pressure of the heated water toward the filter capsule during brewing.

5. The apparatus according to claim 4, wherein the nozzle assembly includes a nozzle mount in which the nozzle plate is positioned; and wherein the nozzle mount includes a seal substantially surrounding the nozzle mount so that the heated water from the water heater is forced to pass through the nozzle plate prior to entering the brewing chamber.

6. An apparatus for using a coffee-filled filter capsule to produce a coffee beverage comprising:
  a brewing unit having a pair of brewing chamber sections being movable relative to one another, between an open position for receiving the filter capsule and a closed position to form a brewing chamber for brewing the coffee; and
  at least one of the brewing chamber sections having a nozzle assembly in fluid communication with a water heater for admitting heated water into the brewing chamber, the nozzle assembly comprising a nozzle plate having at least one water nozzle wherein the nozzle plate compresses the filter when the brewing unit is in the closed position and heated water passes through at least one nozzle, wherein the nozzle plate is in immediate contact with the filter capsule across the body of the filter capsule during the brewing process.

7. An apparatus for using a coffee-filled filter capsule to produce a coffee beverage comprising:
  a brewing unit having a pair of brewing chamber sections being movable relative to one another, between an open position for receiving the filter capsule and a closed position to form a brewing chamber for brewing the coffee; and
  at least one of the brewing chamber sections having a nozzle assembly in fluid communication with a water heater for admitting heated water into the brewing chamber, the nozzle assembly comprising a nozzle plate having at least one water nozzle wherein the nozzle plate compresses the filter when the brewing unit is in the closed position and heated water passes through at least one nozzle, wherein the nozzle assembly includes a nozzle mount in which the nozzle plate is positioned; and wherein the nozzle mount includes a seal substantially surrounding the nozzle mount so that the heated water from the water heater is forced to pass through the nozzle plate prior to entering the brewing chamber.

8. The apparatus according to claim 7, wherein the nozzle mount and one of the brewing chamber sections defines a variable interspace upstream of the nozzle mount relative to heated water flow direction, and a distributing space is defined between the nozzle mount and the nozzle plate.

9. The apparatus according to claim 8, wherein a flow cross-section for the heated water between the water heater and the variable interspace is greater than the flow cross-section between the variable interspace and a distributing space.

10. An apparatus for making a coffee beverage that utilizes a self-contained, coffee-filled filter capsule comprising:
  brewing chamber sections defining a brewing chamber there-between, at least one of the brewing chamber sections being movable back and forth about an axis to provide a slot for directing the filter capsule into the brewing chamber when the brewing chamber sections are spaced apart, the slot extending substantially perpendicular to the axis;
  a water heater in fluid communication with the brewing chamber when a brewing process begins; and
  a nozzle assembly movably connected to one of the brewing chamber sections and comprising a nozzle plate having at least one water nozzle, wherein the nozzle plate compresses the filter during brewing.

11. The apparatus according to claim 10, also including a spring adjacent the nozzle assembly for acting with hydraulic pressure to urge the nozzle assembly toward the filter capsule.

12. The apparatus according to claim 11, wherein the nozzle assembly and one of the brewing chamber sections define a variable interspace upstream from the filter capsule for accommodating pressure buildup from heated water, thereby pressing the nozzle assembly downstream toward the filter capsule during the brewing process.

* * * * *